United States Patent [19]

Pipon et al.

[11] Patent Number: 4,895,038

[45] Date of Patent: Jan. 23, 1990

[54] REINFORCED DOUBLE TOOTHING PLANET WHEEL FOR A MICROMETRIC ARTICULATION USED MORE ESPECIALLY IN VEHICLE SEATS

[75] Inventors: Yves Pipon; Georges Droulon, both of Flers, France

[73] Assignee: A. & M. Cousin Etablissements Cousin Freres, Flers, France

[21] Appl. No.: 188,050

[22] Filed: Apr. 29, 1988

[30] Foreign Application Priority Data

May 5, 1987 [FR] France ................. 87 06317

[51] Int. Cl.$^4$ ............ F16H 1/28; A47C 1/024; B21D 53/28
[52] U.S. Cl. ................... 74/434; 29/159.2; 74/805; 297/362
[58] Field of Search ........... 74/804, 805, 434; 29/159.2; 72/359; 297/362

[56] References Cited

U.S. PATENT DOCUMENTS

| 848,927 | 4/1907 | Schoen | 74/434 X |
|---|---|---|---|
| 2,828,649 | 4/1958 | Boerdijk et al. | 74/805 X |
| 3,192,799 | 7/1965 | Pamplin | 74/805 |
| 4,020,717 | 5/1977 | Johnson | 297/362 X |
| 4,143,912 | 3/1979 | Kramer | 297/362 |
| 4,580,431 | 4/1986 | Oku et al. | 72/359 X |

FOREIGN PATENT DOCUMENTS

| 211926 | 12/1983 | Japan | 297/362 |
| 2158381 | 11/1985 | United Kingdom | 72/359 |

*Primary Examiner*—Allan D. Herrmann
*Attorney, Agent, or Firm*—Becker & Becker, Inc.

[57] ABSTRACT

The planet wheel has either toothings having different diameters but a same tooth module or toothings of a same diameter but different tooth modules. The toothings are produced by die stamping of a disc down to a certain depth which provides, in the median plane of the disc, a central cheek against which bear the toothings thereby stiffening each tooth for preventing it from being crushed and deformed.

7 Claims, 1 Drawing Sheet

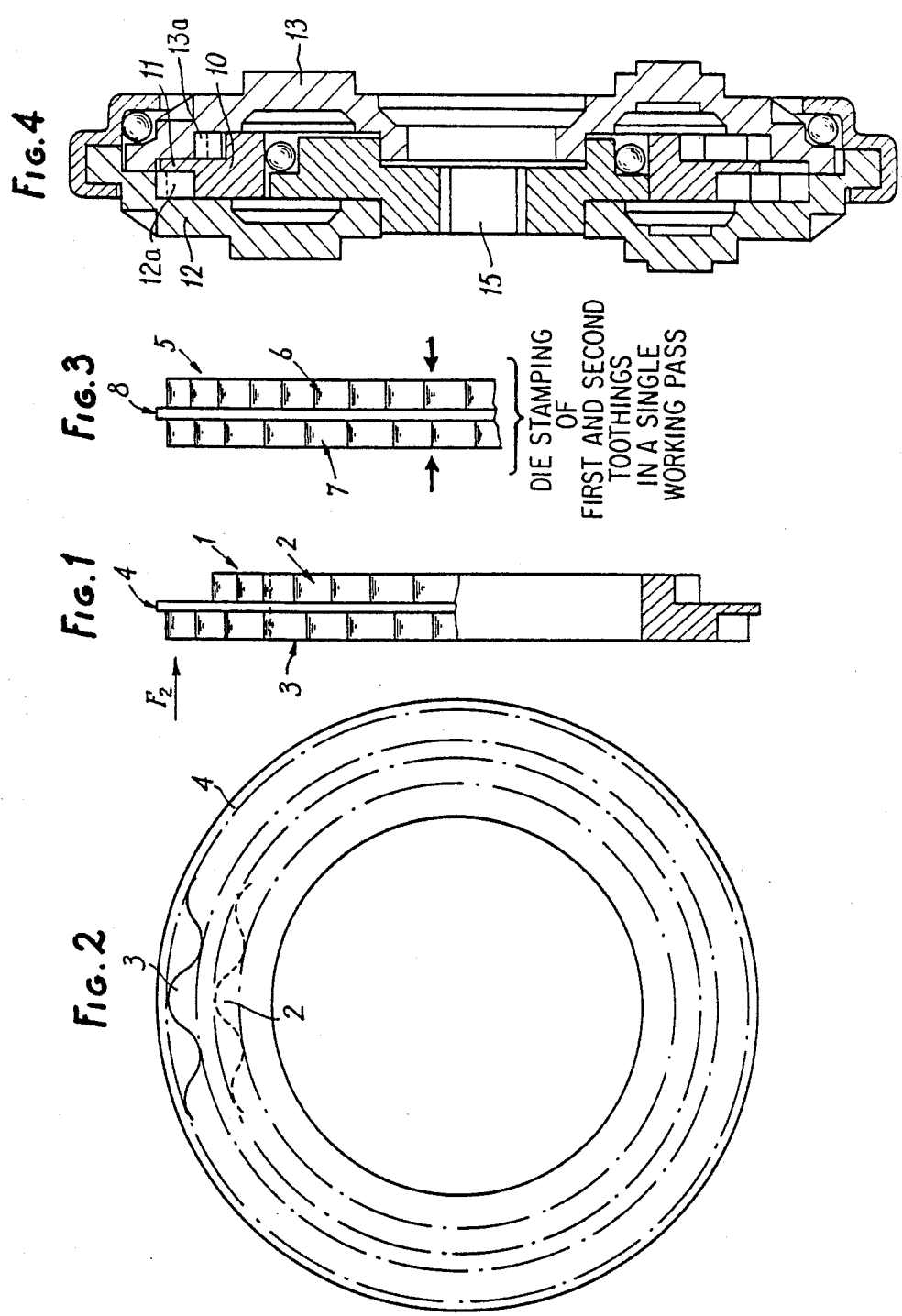

REINFORCED DOUBLE TOOTHING PLANET WHEEL FOR A MICROMETRIC ARTICULATION USED MORE ESPECIALLY IN VEHICLE SEATS

BACKGROUND OF THE INVENTION

Articulations in vehicle seats are currently used either for adjusting inclination of the backing portion of a seat or for adjusting inclination of the seating portion of the seat, the latter also being called an adjustment of the seat trim. Some articulations are generally designated as a micrometric type, enabling an extremely fine adjustment of the positions, that is practically an adjustment hardly perceptible when a small rotation is imparted via a control knob.

In such micrometric articulations, it is necessary that a planet wheel including two adjacent toothings is interposed between the fixed and mobile toothings of the flanges.

Conventionally, the larger diameter toothing of the planet wheel is made by a cutting step after a die stamping step of the smaller diameter toothing.

It will be therefore easily understood that the larger diameter toothing thus made is connected to the mass of the planet wheel only by means of the basis of the toothing, and that only the smaller diameter toothing is adjacent the face of the larger diameter toothing.

Due to this fact, the force necessary for flexing the teeth and breaking them has a value which is rather quickly reached. If the planet wheel is deteriorated, the articulation has then to be totally replaced.

OBJECTS AND SUMMARY OF THE INVENTION

An object of the present invention to provide a modification of the arrangement of the teeth on the planet wheel in order to enable, during manufacture, obtaining a central cheek able to stiffen the planet wheel, to which central cheek are adjoined on either side, toothings having a different number of teeth.

There is thereby obtained a planet wheel having teeth the resistance of which is identical on both sides of the central cheek without substantially increasing the volume and weight of the planet wheel, but providing a considerable increase in the strength of the micrometric articulation.

Moreover, this invention covers planet wheels having toothings of two different diameters with a same tooth module, as well as planet wheels having toothings of same diameter but with a different number of teeth, hence a different module. Actually, in the two above arrangements, the toothings on either side of the central cheek have a different number of teeth.

According to the invention, the reinforced double toothing planet wheel for a micrometric articulation used particularly in vehicle seats, includes two toothings separated by a central cheek, the two toothings being made by die stamping in a single working pass of a disc down to a certain depth, the die stamping forming, in the median plane of the disc, the central cheek against which bear the two toothings, whereby each tooth of the two toothings is stiffened and prevented from being crushed and deformed.

Various other features of the invention will become more apparent from the following detailed description.

BRIEF DESCRIPTION OF THE DRAWING

Embodiments of the invention are shown, by way of non limiting examples, in the accompanying drawings, wherein:

FIG. 1 is a front elevation view, partly in cross-section, of a first embodiment of the invention of a planet wheel having two opposed toothings of different diameter but same tooth module;

FIG. 2 is a side view corresponding to FIG. 1, as seen in the direction of arrow $F_2$ in FIG. 1;

FIG. 3 is a partial front elevation view of another embodiment of a planet wheel of constant toothing diameter but different tooth modules;

FIG. 4 is a view that shows schematically a round articulation provided with the planet wheel of FIG. 1.

Referring now to the drawings, FIGS. 1 and 2 show a planet wheel 1 which is produced from a solid piece subjected to die stamping between a die and a punch for forming, on one side, a toothing 2 of smaller diameter and, on the other side, a toothing 3 of larger diameter.

In this case, the tooth module of the toothings 2 and 3 is identical, and the planet wheel has, in its median plane, a central flange or cheek 4 forming a strengthening element between the toothings 2 and 3. This method for producing the planet wheel 1 is such that the punches used for forming the toothings do not drive-in any more in the corresponding die, thereby enhancing the life time of the tools.

In FIG. 3, there is shown a planet wheel 5 having toothings 6 and 7 of same diameter but with a different number of teeth since the tooth module of the toothings 6 and 7 is different.

The invention makes it possible to obtain a better strength for the planet wheel, even when reducing its thickness, since the central cheek 8 is placed in the median plane of the planet wheel, this central cheek permitting a configuration to considerably back up the two toothings and therefore to increase their strength.

Attention should also be drawn to the fact that, in the case of FIG. 1 as well as in the case of FIG. 3, the planet wheel 1 or 5, when used in an articulation, is guided between the two flanges of the articulation via the central cheek 4 or 8 which protrudes in each case beyond the maximum diameter of the toothings and also prevents an easy escape of the toothed area which is between the flanges of the articulation and planet wheel. This is in fact particularly clearly illustrated in FIG. 4 where there is shown a planet wheel 10 which is substantially identical to that of FIG. 1 and which is guided via its central cheek 11 between the fixed and mobile flanges 12 and 13, respectively, thereby presenting the complementary characteristics as hereabove indicated.

It should further by mentioned this planet wheel is made by a method which is rather conventional but improved since the teeth of the two sides of the planet wheel are die stamped in only one working pass represented by thick arrows in FIG. 3. There is thus obtained an easy positioning of the planet wheel within the inner toothings 12a, 13a of the flanges of a given articulation and a suitable regularity of the angular position of one of the flanges with respect to the other flange. This feature is also obtained in case, of a mass production manufacturing permitting mounting of two articulations on the same seat in a correct original position, which ensures a driving square or star 15 (see FIG. 4) to be perfectly in register on the two sides of a seat, and which thereafter make it possible to mount, on automatic machines, the coupling bars of the two articulations.

The present invention is, of course, in no way restricted to the specific disclosure of the specification and drawing, but also encompasses any modifications within the scope of the appended claims.

What is claimed is:

1. A reinforced double-toothed planet wheel for a micrometric articulation, especially for use in vehicle seats, with said planet wheel having opposite sides, whereby a first toothing is disposed on one side of said planet wheel and a second toothing is disposed on the other side of said planet wheel, and with said toothings being produced by die stamping a disc to a predetermined depth so that said planet wheel comprises:

a central cheek that is disposed as a strengthening element in a median plane of said disc for the planet wheel even when reducing the thickness thereof, with said toothings bearing perfectly in register against said central cheek on opposite sides thereof, each of said toothings being stiffened to resist crushing and deformation with said central cheek as a mounting support that assures a perfect symmetry and concentricity of said two toothings without any burrs and without having any punch to be maintained sharp during manufacture, now with a higher precision at a lower cost and at a greater production rate than with the punch.

2. A planet wheel according to claim 1, in which said first and second toothings have different diameters but the same tooth module.

3. A planet wheel according to claim 1, in which said first and second toothings have the same diameter and different tooth modules.

4. A method of producing a reinforced double-toothed planet wheel for a micrometric articulation, especially for use in vehicle seats, with said planet wheel having opposite sides, whereby a first toothing is disposed on one side of said planet wheel and a second toothing is disposed on the other side of said plant wheel, and with said toothings being produced by a step of die stamping a disc to a predetermined depth so that said planet wheel includes a central cheek that is disposed as a strengthening element in a median plane of said disc for the planet wheel even when reducing the thickness thereof, with said two toothings bearing perfectly in register against said central cheek on opposite sides thereof, each of said toothings being stiffened to resist crushing and deformation in one piece with the central cheek as an intermediate mounting support which includes the step of effecting said die stamping of said first and second toothings in a single working pass as to said disc.

5. In a method for making a reinforced double-toothed planet wheel wherein the planet wheel has two toothings separated by a central creek against which bears the two toothings for reinforcing the planet wheel and preventing the planet wheel to be crushed and deformed, the improvement therewith comprising the step of die stamping the two toothings in a single working pass of a disc down to a predetermined depth, thereby providing thereafter an easy and accurate positioning of said planet wheel inside inner toothings of an articulation with two flanges and obtaining a regular angular position of a first one of the articulation flanges with respect to a second one of the articulation flanges, as well as a perfect symmetry and identity between two articulation flanges.

6. A method as set forth in claim 5, wherein said die stamping in a single pass comprises the step of forming two toothings that have different diameters but a same tooth module.

7. A method as set forth in claim 5, wherein said die stamping in a single pass comprises the step of forming two toothings that have the same diameter and different tooth modules.

* * * * *